United States Patent
Lin (10) Patent No.: US 11,179,659 B2
(45) Date of Patent: Nov. 23, 2021

(54) OIL FILTER WITH REPLACEABLE FILTER CORE

(71) Applicant: Ren-Jie Lin, Taichung (TW)

(72) Inventor: Ren-Jie Lin, Taichung (TW)

( * ) Notice: Subject to any disclaimer, the term of this patent is extended or adjusted under 35 U.S.C. 154(b) by 0 days.

(21) Appl. No.: 16/661,047

(22) Filed: Oct. 23, 2019

(65) Prior Publication Data

US 2020/0122066 A1   Apr. 23, 2020

(30) Foreign Application Priority Data

Oct. 23, 2018   (TW) .................................. 107137274

(51) Int. Cl.
*B01D 29/96* (2006.01)
*F01M 11/03* (2006.01)
*B01D 35/00* (2006.01)

(52) U.S. Cl.
CPC ........... *B01D 29/96* (2013.01); *B01D 35/005* (2013.01); *F01M 11/03* (2013.01); *B01D 2201/30* (2013.01)

(58) Field of Classification Search
CPC ........ B01D 2201/301; B01D 2201/302; B01D 2201/304; B01D 2201/306; B01D 35/30; B01D 29/26
See application file for complete search history.

(56) References Cited

U.S. PATENT DOCUMENTS

| 4,454,036 | A | * | 6/1984 | Suzuki | B01D 27/07 |
| | | | | | 210/117 |
| 5,374,355 | A | * | 12/1994 | Habiger | B01D 29/114 |
| | | | | | 210/440 |
| 6,595,372 | B1 | * | 7/2003 | Minowa | B01D 29/21 |
| | | | | | 210/440 |
| 2003/0080036 | A1 | * | 5/2003 | Nguyen | B01D 35/18 |
| | | | | | 210/185 |
| 2003/0146142 | A1 | * | 8/2003 | Roll | B01D 35/31 |
| | | | | | 210/232 |
| 2015/0001143 | A1 | * | 1/2015 | Bell | F01M 1/10 |
| | | | | | 210/232 |
| 2018/0229164 | A1 | * | 8/2018 | Linhart | B01D 27/103 |

FOREIGN PATENT DOCUMENTS

| CN | 1306152 | A | * | 8/2001 | |
| CN | 105443192 | A | * | 3/2016 | |
| CN | 207018050 | U | * | 2/2018 | |
| DE | 4124323 | A1 | * | 1/1993 | ........... B01D 27/106 |

OTHER PUBLICATIONS

DE-4124323-A1 English translation of Description provided by ESPACENET (Year: 2021).*
DE-4124323-A1 English translation of Abstract provided by ESPACENET (Year: 2021).*

* cited by examiner

*Primary Examiner* — Michael A Kessler (74) *Attorney, Agent, or Firm* — Birch, Stewart, Kolasch & Birch, LLP (57) ABSTRACT

An oil filter with replaceable filter core is disclosed and includes a detachable seal cap, so that a user could open the seal cap and individually replace a broken filter core in the oil filter without discarding other parts remain intact, so as to avoid unnecessary waste and further contribute to environmental protection and resources conservation.

8 Claims, 9 Drawing Sheets

OIL FILTER WITH REPLACEABLE FILTER CORE

BACKGROUND OF THE INVENTION

Technical Field

The present invention generally relates to an oil filter, and more particularly to an oil filter with replaceable filter core.

Description of Related Art

When engines are under operation, impurities will accrue in machine oil over time. The causes can be many. For example, dust from the atmosphere, metal shards generated by rubbing between internal metal parts, or carbon particles caused by incomplete combustion. If these impurities travel with machine oil to the surface of machine parts, the machine oil's ability of lubrication will be reduced. In such scenario, the impurities would cause damages when machine parts are under operation, deteriorating the machine parts. In order to prevent from impurities, oil filters need to be connected to engines to screen out impurities in the machine oil. Further, the filtered and cleansing machine oil can be delivered to each machine part, thus to reduce the frictions between machine parts and further elongate the life time of machines.

Oil filters needs to be altered constantly in order to maintain the performance of oil filtering. This is because after being used for a long term, excessive amount of impurities will accrue on the filter core. The impurities block the filter holes on the filter core and thus brings the filter performance down. That says, filter cores need to be replaced constantly in order to rejuvenate the filter performance. However, oil filters now available on the market are manufactured with a sealed outer shell, as well as several parts and filter core arranged in the outer shell. That sealed outer shell prevents users to replace the failed/damaging filter core (or old filter core), user instead ditch the entire oil filter and go for new oil filers even though the outer shell of old oil filters are still usable That kind of disposal of oil filters brings heavy burdens to the environment.

Moreover, traditional oil filters have deficiencies of poor heat dissipation performance and are always over weight. Poor heat dissipation performance makes machine oil to be unable to be cooled down and thus lower machine oil's viscosity, which further damages the machine oil's lubrication ability. Over weight will increase vehicles' loading, which leads to energy waste.

Therefore, the design of traditional oil filters needs to be improved and modified, and how to come up with an improved design for oil filters to advance the heat dissipation performance and to lower the weight is of industries' concerns.

BRIEF SUMMARY OF THE INVENTION

In view of the above, the primary objective of the present invention is to provide an oil filter, which includes a detachable seal cap, and a user could open the seal cap and individually replace the damaged filter core (or old filter core) disposed in an outer shell of the oil filter.

The present invention provides an oil filter, including an outer shell and a filter core which is replaceable, wherein the outer shell includes a main body and a seal cap. The main body is made of a material with thermal conductivity greater than and specific weight smaller than iron and is in a cylinder shape with an opening on a top thereof, and has an inlet for a machine oil to flow in and an outlet for the machine oil to flow out. The seal cap is detachably engaged with the main body to seal the opening. The filter core is disposed inside the outer shell on a path that the machine oil flows.

In an embodiment, the seal cap and the opening of the main body have corresponding screw thread; the seal cap is screwed with the main body to seal the opening; the main body is made of aluminum.

In an embodiment, the oil filter includes a check valve disposed between the inlet of the main body and the filter core to prevent the machine oil from reversely flow out through the inlet of the main body.

In an embodiment, the main body has a tube therein; the tube is a hollow structure with a first opening and a second opening formed at two ends of the tube; a wall of the tube has a plurality of holes; the first opening of the tube communicates with the outlet of the main body; the filter core fits around an outer portion of the tube.

In an embodiment, a first unidirectional valve is arranged on the first opening of the tube, the machine oil flows into the tube through the plurality of holes, and passes through the first unidirectional valve and flows out through the outlet; the first unidirectional valve prevents the machine oil from flowing back into the tube; a second unidirectional valve is arranged on the second opening of the tube, the machine oil flowing between the main body and the tube passes through the second unilateral and enters the tube; the second unidirectional valve prevents the machine oil from flowing back into the space between the main body and the tube.

In an embodiment, the tube has an external screw thread and an internal screw thread which is formed on an inner wall of the outlet of the main body; the tube is engaged with the main body by screwing the external screw thread and the internal screw thread; alternatively, the tube and the main body are integrally formed as a monolithic unit.

In an embodiment, the oil filter further includes a stable structure arranged between the seal cap and the filter core; the stable structure makes the filter core to be uprightly arranged in the outer shell and to be no contact with the inner wall of the main body.

In an embodiment, the stable structure includes a compression spring, each of two ends of the compression spring forms a spring coil respectively facing and abutted against an inner surface of the seal cap and an upper surface of the filter core.

In an embodiment, a protruding portion is formed on the inner surface of the seal cap; a part of the compression spring fits around the protruding portion.

In an embodiment, the filter core includes a filter element and a tube, the filter element is configured to filter the machine oil and fits around the tube, the tube is a hollow structure with two openings formed at two ends of the tube; a wall of the tube has a plurality of holes; one of ends of the tube is connected to the outlet of the main body; the machine oil could flow into the main body through the inlet and passes through the filter element, and flows into the tube through the plurality of holes and flows out through the outlet.

In an embodiment, the filter core includes a first unidirectional valve and a second unidirectional valve which are respectively disposed at the two ends of the tube; the machine oil flows into the tube through the plurality of holes, and passes through the first unidirectional valve and flows out from the outlet; the first unidirectional valve prevents the machine oil from flowing back into the tube; the machine oil flowing between the main body and the tube passes through the second unilateral and enters the tube; the second unidirectional valve prevents the machine oil from flowing back into the space between the main body and the tube.

With the aforementioned design, the seal cap is detachable engaged with the main body, so that the user could replace the old or damaged filter core in the main body with a new one, instead of replacing a whole new oil filter, preventing resources from being wasted and preventing the environment from damaging.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Reference will now be made in detail to the preferred embodiments of the present invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for the purposes of explanation, numerous specific details are set forth in order to provide a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

Reference is firstly made to FIGS. 1-6, which depict an oil filter 100 according to a first embodiment of the present invention. The oil filter 100 includes an outer shell 10, a filter core 20 and a stable structure. The outer shell 10 is formed by a main body 11 and a seal cap 12. In the present embodiment, the main body 11 is made of certain material with thermal conductivity greater than and specific weight smaller than iron, such as aluminum, thereby to provide advantages coming from the use of aluminum, such as good heat dissipation performance, light weight, and etc. In an embodiment, the seal cap could also be made of material with thermal conductivity greater than and specific weight smaller than iron.

The main body 11 is in a cylinder shape with an opening on a top thereof. An inner screw thread 11a is disposed on an inner wall of the main body 11. An external screw thread 12a is disposed on a periphery of the seal cap 12 to be screwed with the inner screw thread 11a of the main body 11, so as to seal the opening on the top of the main body 11. Moreover, it is preferably that a seal ring 14 is disposed between the main body 11 and the seal cap 12 for preventing leakage.

Figure 1:
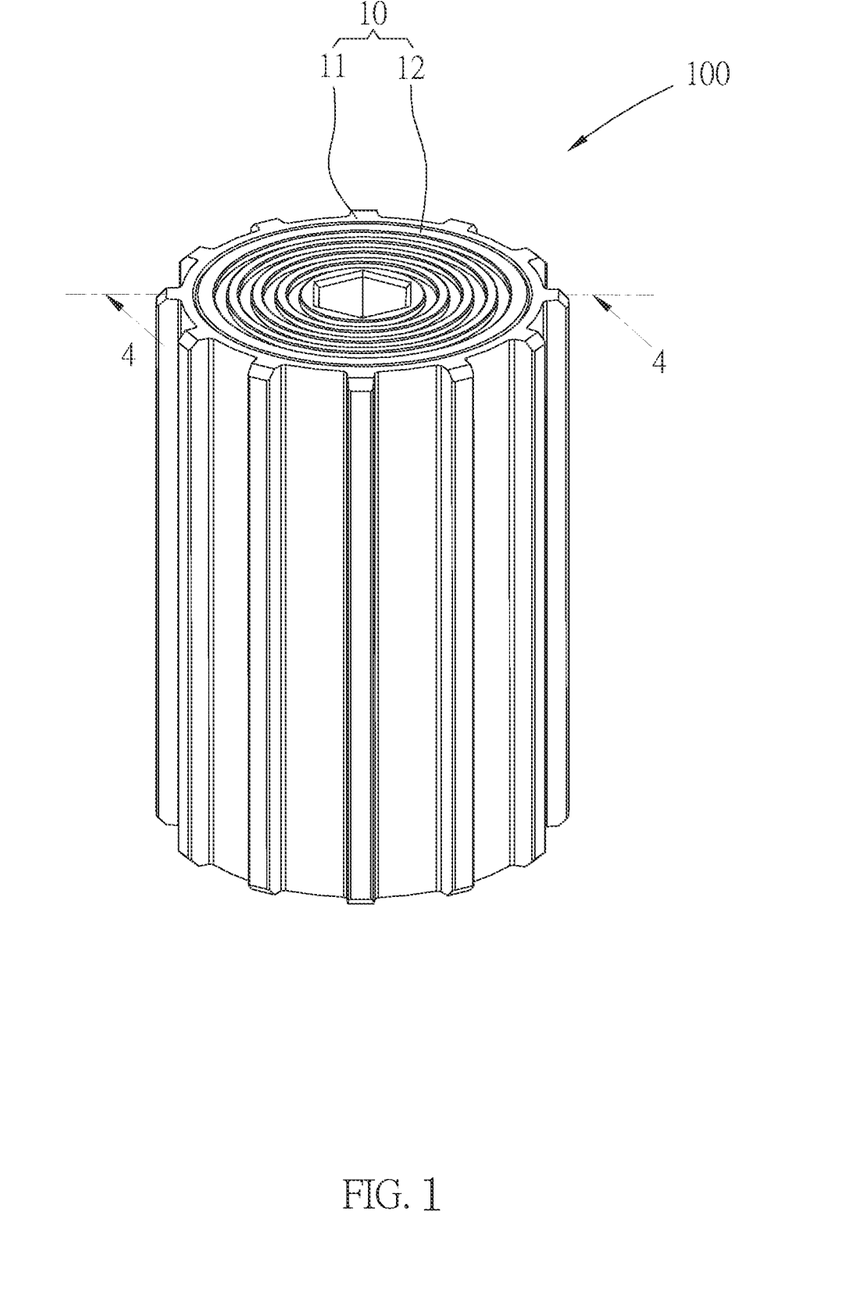
FIG. 1 is a perspective view illustrating the oil filter with replaceable filter core according to a first embodiment of the present invention.
Figure 2:
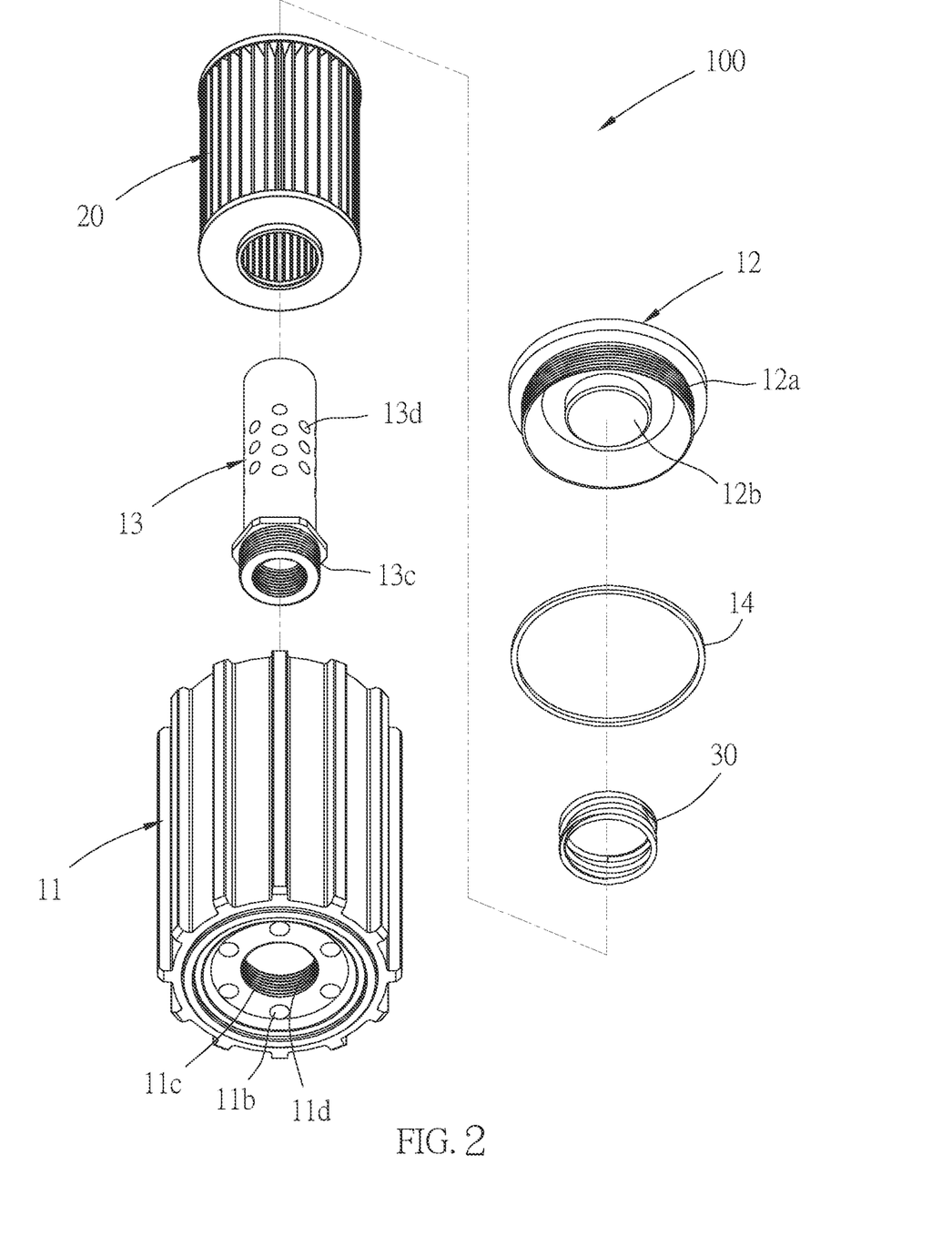
FIG. 2 is an exploded view illustrating the oil filter according to the first embodiment of the present invention.
Figure 3:
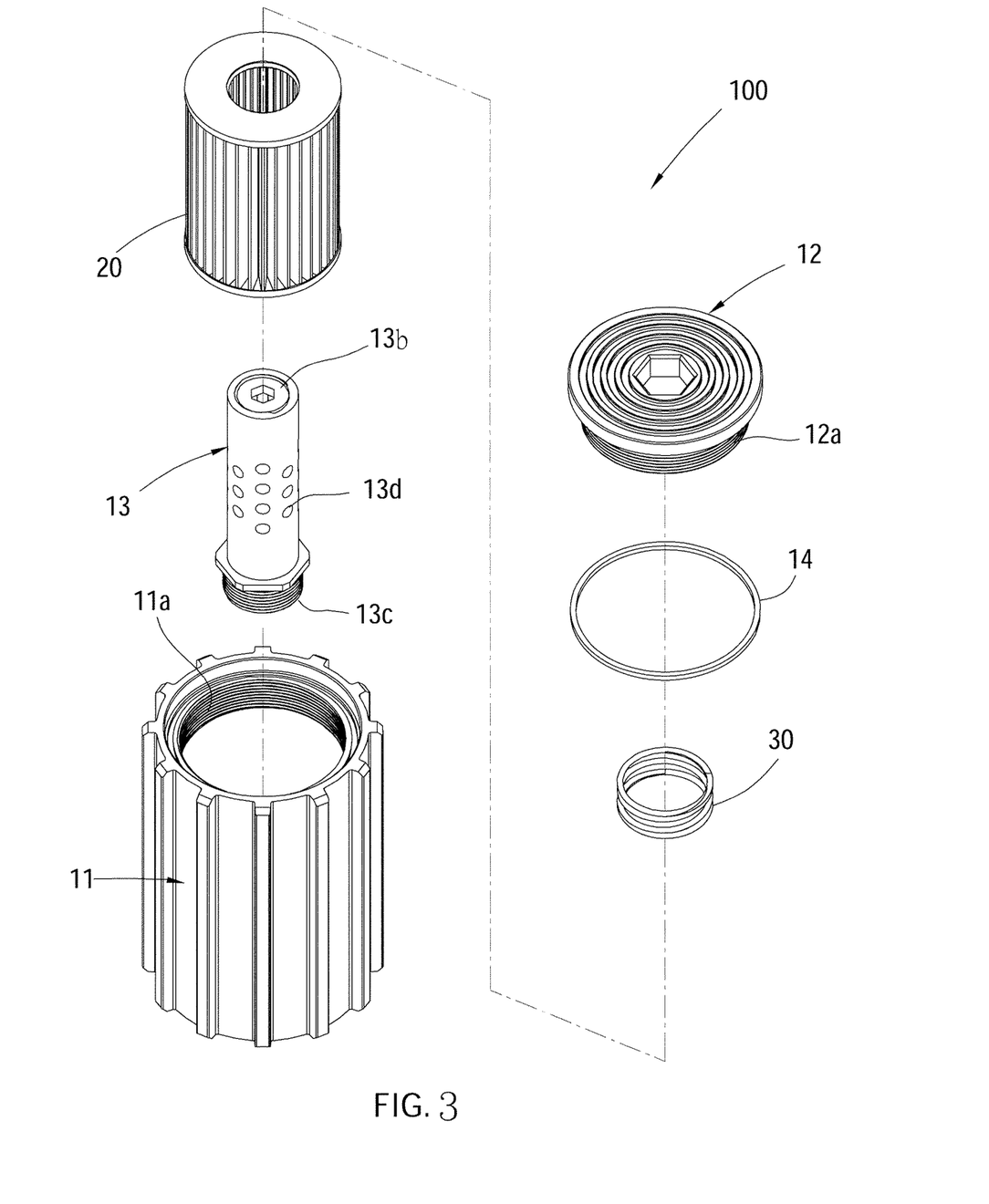
FIG. 3 is an exploded view illustrating the oil filter according to the first embodiment of the present invention.
Figure 4:
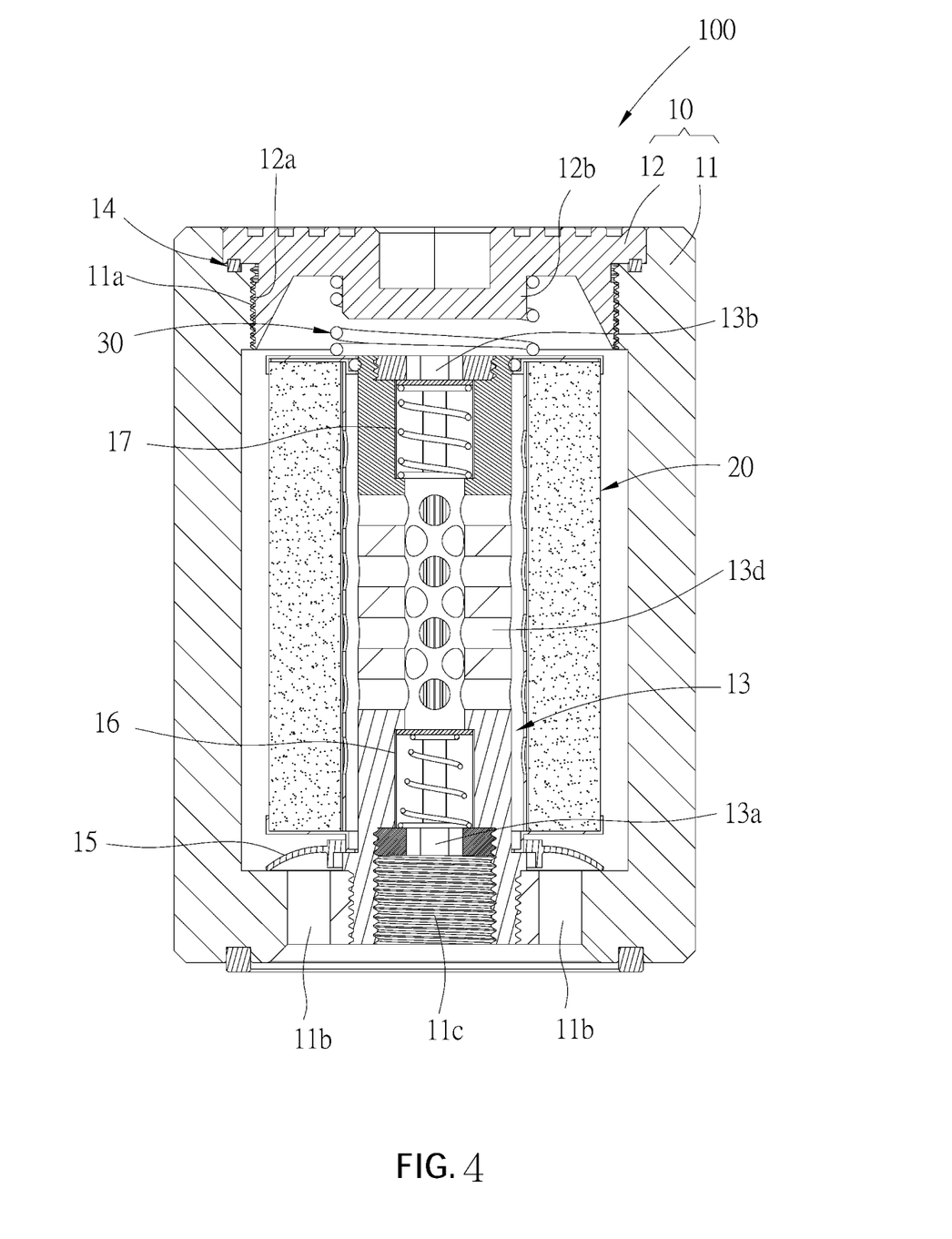
FIG. 4 is a sectional view along the 4-4 line in FIG. 1.

A bottom of the main body 11 has a plurality of inlets 11b for machine oil to flow in and an outlet 11c for machine oil to flow out, wherein an internal screw thread 11d is disposed on an inner wall of the outlet 11c. A tube 13 is fixed inside the main body 11. In the present embodiment, the tube 13 is in a hollow structure with a first opening 13a and a second opening 13b formed on two ends of the tube 13. An external screw thread 13c is formed on an external peripheral surface of the tube 13 at a position close to the first opening 13a. The tube 13 is fixed with the main body 11 by screwing the internal screw thread 11d on the outlet 11c of the main body 11 and the external screw thread 13c, so that the tube 13 communicates with outside via the outlet 11c. Further, a wall of the tube 13 has a plurality of holes 13d.

The filter core 20 is in a hollow structure and fits around an outer surface of the tube 13, and a stable structure is arranged at the filter core 20 and the seal cap 12. In the present embodiment, each of two ends of the stable structure forms a compression spring 30 of a spring coil, and the spring coil faces and abuts against an inner surface of the seal cap 12 and an upper surface of the filter core 20 in a manner of contact. The inner surface of the seal cap 12 has a protruding portion 12b. A part of the compression spring 30 fits around the protruding portion 12b. The compression spring 30 makes the filter core 20 to be uprightly arranged in the outer shell 10 and to be no contact with the inner wall of the main body 11.

As described in the previous paragraphs, the filter core 20 is detachably arranged inside the outer shell 10, so that when a user desires to replace the filter core 20, the seal cap 12 is rotated so as to separate the seal cap 12 and the main body 11, and then the old/failed filter core 20 is pulled out and a new filter core 20 is put back to fits around the tube 13 for replacement. Finally, after engaging the seal cap 12 and the main body 11, the oil filter could be used again with brand new filtering performance. That is, the design flaws exhibited in traditional oil filters are modified and improved in the present invention. All the user needs to is to replace the damaged filter core with new filter core without discarding other parts remain intact, so as to avoid unnecessary waste. Moreover, the two ends of the compression spring 30 respectively fit around the protruding portion, thereby to provide better support, so that the compression spring 30 could further firmly support and position the filter core 20, which improves the deficiency of filter core's loosening due to the vibration caused by the oil filter, and even improves loosened filter core colliding with the inner wall of the oil filter which further leads to poor oil filtering performance.

Figure 5:
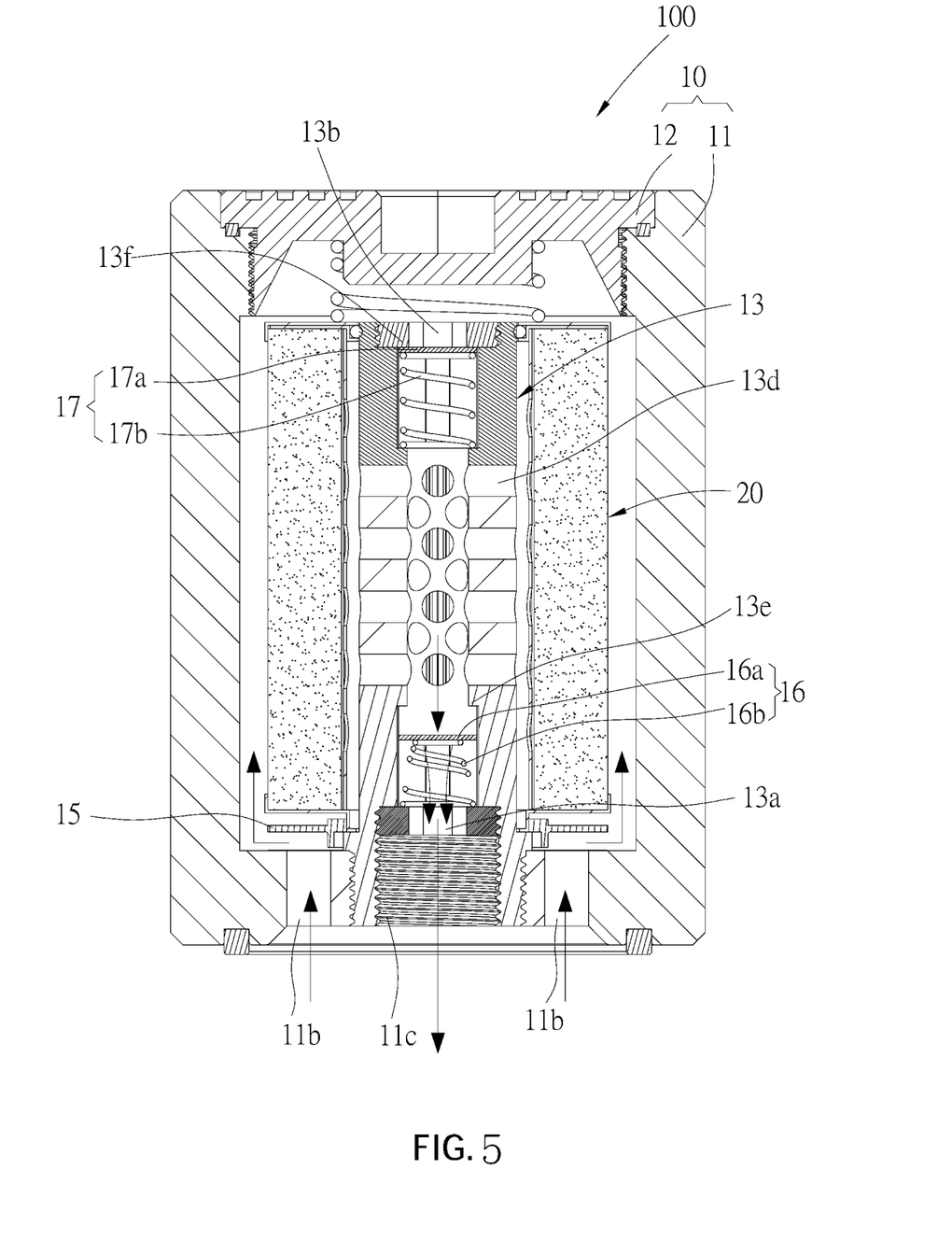
FIG. 5 is a schematic view illustrating the oil filter according to the first embodiment of the present invention is in a state of use.
Figure 6:
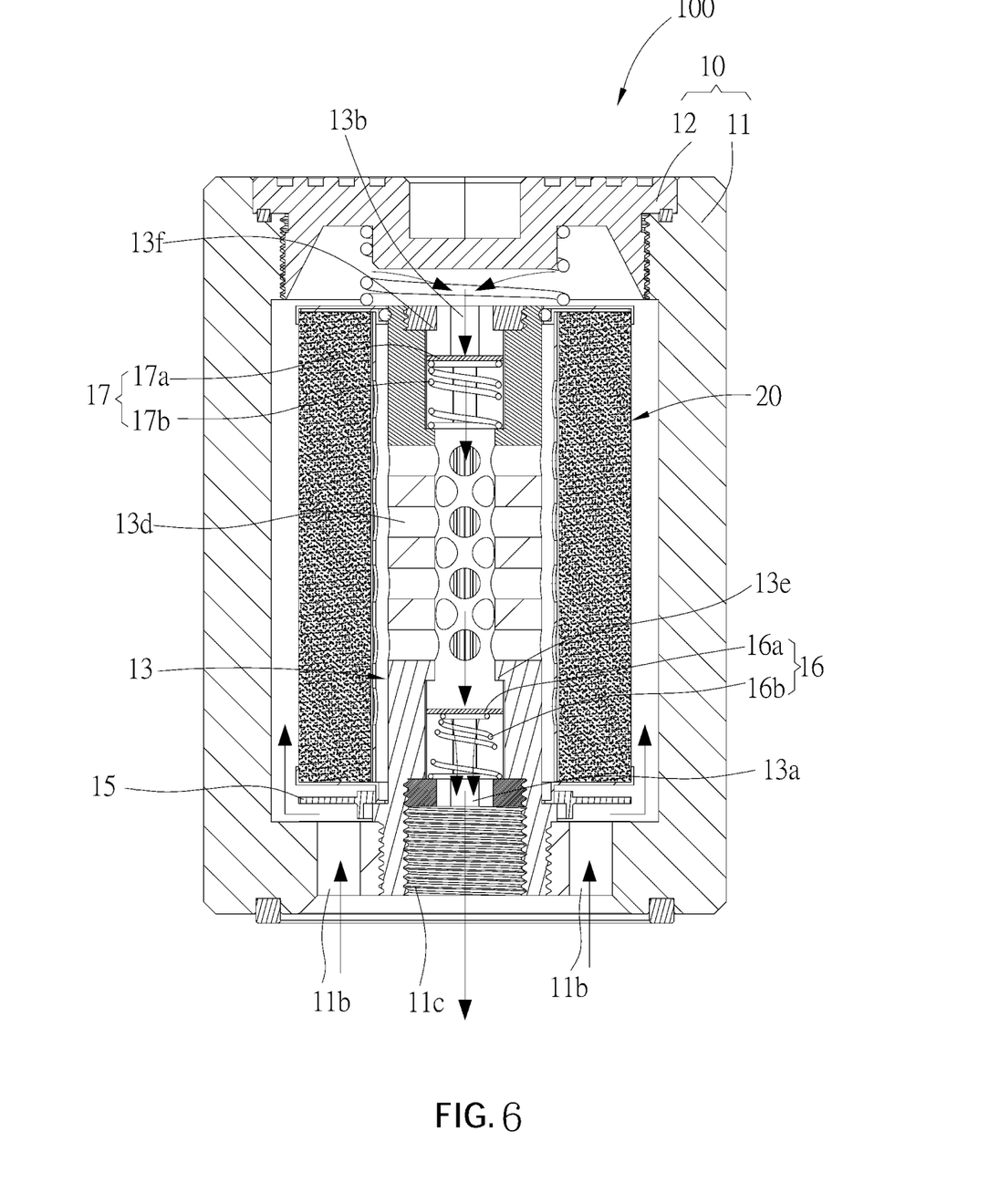
FIG. 6 is a schematic view illustrating the oil filter according to the first embodiment of the present invention is in another state of use.

With the aforementioned structures, the filter core-replaceable oil filter 100 further includes a check valve 15, a first unidirectional valve 16 and a second unidirectional valve 17. The check valve 15 is a flexible sheet, disposed in between the inlet 11b of the main body 11 and the filter core 20. Under a normal situation (i.e., when machine oil does not flow into an inside of the main body 11 via the inlet 11b), the check valve 15 seals the inlet 11b, so that when the machine oil flows into the main body 11 via the inlet 11b, the machine oil propels the check valve 15, causing a transformation of the check valve 15 and thus to open the inlet 11b. Conversely, when machine oil is stopped from fed into the oil filter, the check valve 15 would recover to its original position and seal the inlet 11b again to prevent the machine oil from flowing out from the inlet 11b.

The first unidirectional valve 16 is disposed in the tube 13 and is located close to the first opening 13a. The first unidirectional valve 16 includes a gasket 16a and a spring 16b. An elastic force of the spring 16b urges a surface of the gasket 16a to be abutted against a first protrusion shoulder part 13e protruding from an inner wall of the tube 13, so as to block an inside of the tube 13 and the outlet 11c of the main body 11. When machine oil flows into the main body 11 from the inlet 11b, and passes through the filter core 20 for filtering impurities, the machine oil flows into the tube 13 through the holes 13d on the wall of the tube 13. When machine oil accumulates to a certain amount, a hydraulic pressure caused by machine oil would force the gasket 16a to move toward the outlet 11c, so as to compress the spring 16b. At this time, the machine oil passes through the first unidirectional valve 16 and flows out through the outlet 11c. Conversely, when machine oil is stopped from being fed into the oil filter, the hydraulic pressure caused by the machine oil in the main body 11 is released, so that the elastic force exerted by the spring 16b is released, and the spring 16b recovers back to originally stretching state and pushes the gasket 16a back to abut against the first protrusion shoulder part 13e on the inner wall of the tube 13, preventing machine oil from flowing back into the tube 13 through the outlet 11c.

The second unidirectional valve 17 is disposed at the second opening 13b of the tube 13 and includes a gasket 17a and a spring 17b. An elastic force of the spring 17b urges a surface of the gasket 17a of the second unidirectional valve 17 to be abutted against a second protrusion shoulder part 13f protruding from the inner wall of the tube 13, so as to block the second opening 13b. When machine oil could not pass through the filter core 20 and flow into the tube 13 due to a blockage of the filter core 20, and the machine oil accumulates to a certain amount, the hydraulic pressure caused by machine oil will force the gasket 17a to move toward the inside of the tube 13, so as to compress the spring 17b. At this time, machine oil passes through the second unidirectional valve 17 and flows into the tube 13, and flows out of the main body 11 from the outlet 11c. As such, problems such as damages to the outer shell 10 due to excessive pressure or machine oil leakage could be prevented.

Figure 7:
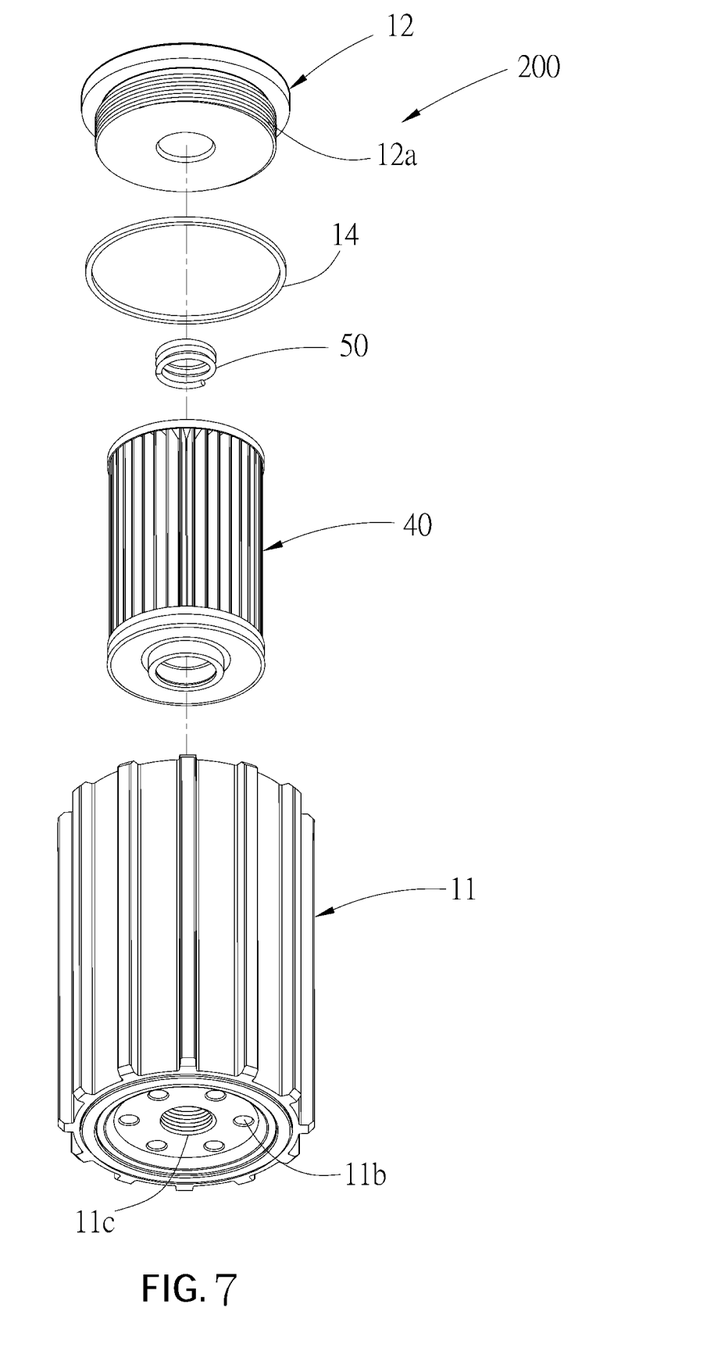
FIG. 7 is an exploded view illustrating the oil filter according to a second embodiment of the present invention.
Figure 8:
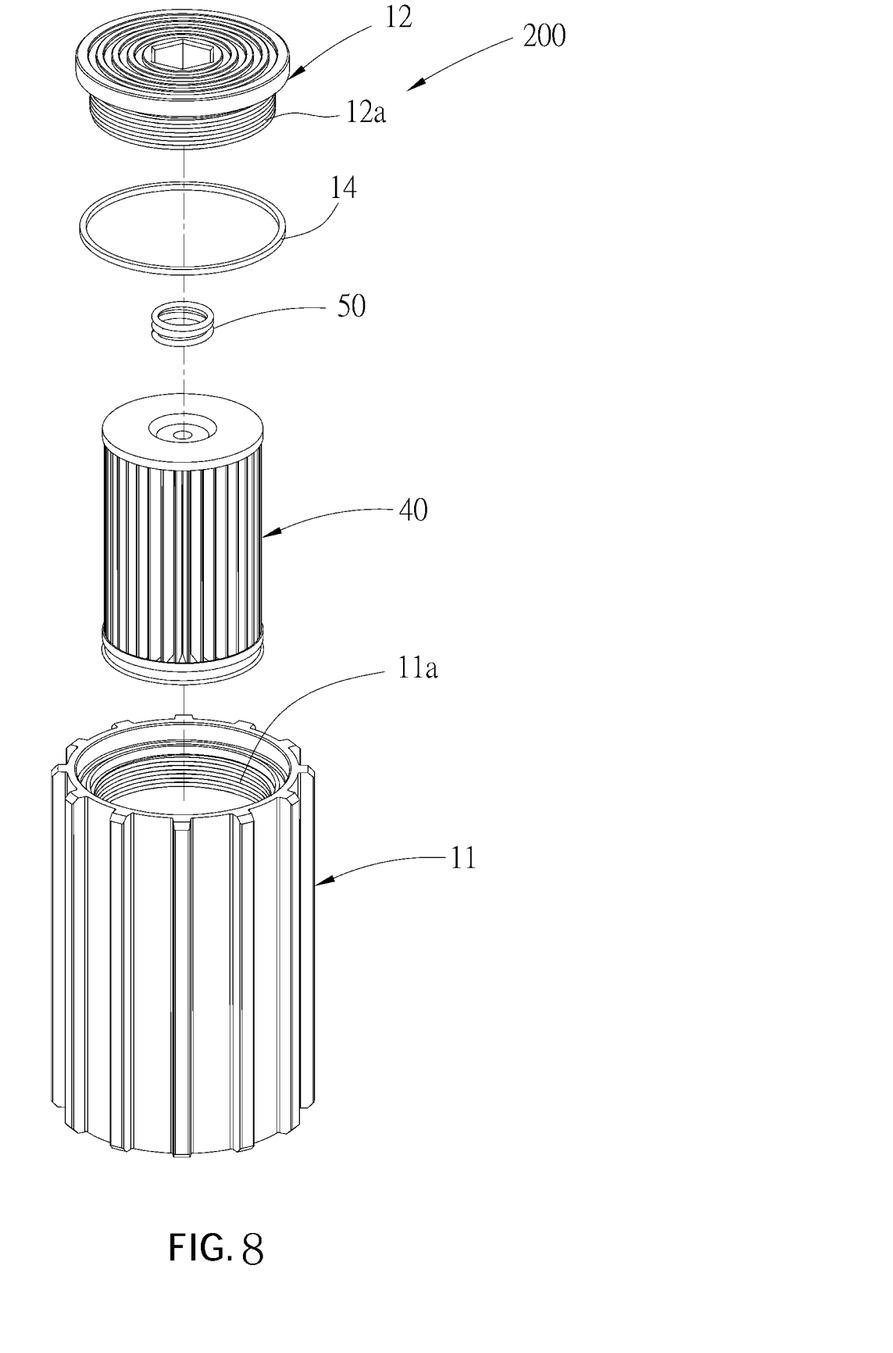
FIG. 8 is an exploded view illustrating the oil filter according to the second embodiment of the present invention.
Figure 9:
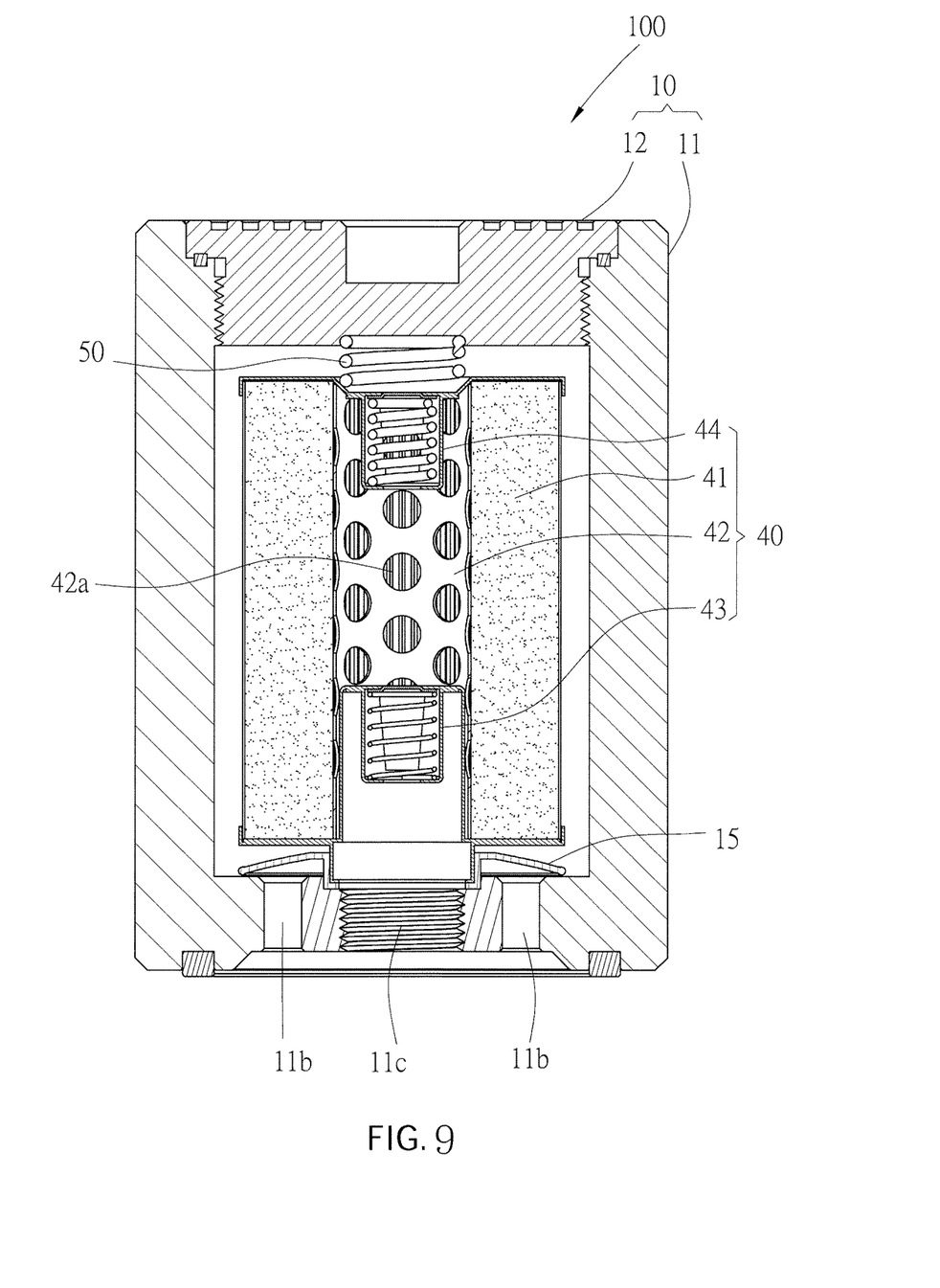
FIG. 9 is a sectional view illustrating the oil filter according to the second embodiment of the present invention.

Reference is next made to FIGS. 7-9, which illustrate an oil filter 200 with replaceable filter core according to a second embodiment of the present invention. The oil filter 200 includes the same outer shell 10 and the stable structure exemplified as the compression spring 30 as described in the previous paragraphs. However, the structure of a filter core 40 of the oil filter 200 is different from that of the oil filter 100.

Referring to FIG. 9, the filter core 40 of the oil filter 200 includes a filter element 41, a tube 42, a first unidirectional valve 43 and a second unidirectional valve 44. The filter element 41 is adapted to filter machine oil and fits around an outside of the tube 42. A wall of the tube 42 has a plurality of holes 42a. The tube 42 is in a hollow structure with two openings at two ends thereof, wherein one of the ends communicates with the outlet 11c of the main body 11, and the first unidirectional valve 43 is arranged at a junction that one of the ends communicates with the outlet 11c. The second unidirectional valve 44 is arranged at the other end of the tube 42. The machine oil could flow into the main body 11 thought the inlet 11b, and pass through the filter element 41, and flow into the tube 42 through the holes 42a and flows out through the outlet 11c. The efficiencies of the first unidirectional valve 43 and the second unidirectional valve 44 are the same as the first embodiment, and thus the relevant descriptions will not be described herein.

The filter core 40 has a protruding portion at an end of the filter core 40 close to the outlet 11c of the main body 11, wherein the protruding portion is adapted to be engaged with the inner wall of the outlet 11c. A stable structure 50 is arranged at another end of the filter core 40 close to the seal cap 12, wherein two ends of the stable structure 50 respectively abut against the seal cap and the filter core 40, making the filter core 40 to be uprightly arranged in the outer shell 10 and to be not contact with the inner wall of the main body 11. The filter core 40 is detachably installed in the outer shell, so that the user could replace an old filter core with a new filter core, as described in the previous paragraphs.

It must be pointed out that the embodiments described above are only some preferred embodiments of the present invention. All equivalent structures which employ the concepts disclosed in this specification and the appended claims should fall within the scope of the present invention.

What is claimed is:

1. An oil filter with a filter core which is replaceable, comprising: an outer shell including a main body and a seal cap, wherein the main body is made of a material with a thermal conductivity greater than and with a specific weight smaller than iron; the main body is in a cylinder shape with an opening on a top of the main body and has an inlet for a machine oil to flow in and an outlet for the machine oil to flow out, wherein both of the inlet and the outlet are located on a bottom of the main body opposite to the opening, and a side wall of the main body and the bottom of the main body are integrally formed as a monolithic unit; the seal cap is detachably engaged with the top of the main body to seal the opening; the filter core disposed inside the outer shell, wherein the filter core is located on a path that the machine oil flows; and a stable structure which is disposed between the seal cap and the filter core and is adapted to make the filter core to be uprightly arranged in the outer shell and to make the filter core to be not in contact with an inner wall of the main body; wherein the stable structure comprises a compression spring; two ends of the compression spring respectively abut against an inner surface of the seal cap and an upper surface of the filter core; the inner surface of the seal cap has a protruding portion; a part of the compression spring fits around the protruding portion;

wherein an inside of the main body has a tube; the tube is in a hollow structure with a first opening and a second opening formed on two ends of the tube; a wall of the tube has a plurality of holes;

the first opening communicates with the outlet of the main body; the filter core fits around an outer portion of the tube; wherein a first unidirectional valve is disposed on the first opening of the tube; the machine oil flows into the tube through the plurality of holes and passes through the first unidirectional valve and flows out through the outlet; the first unidirectional valve is adapted to prevent the machine oil from flowing back into the tube; a second unidirectional valve is disposed on the second opening of the tube; the machine oil flowing between the main body and the tube passes through the second unilateral and enters the tube; the second unidirectional valve is adapted to prevent the machine oil from flowing back into a space between the main body and the tube.

2. The oil filter with replaceable filter core as claimed in claim 1, further comprising a check valve disposed between the inlet of the main body and the filter core for preventing the machine oil from reversely flowing out via the inlet of the main body.

3. The oil filter with replaceable filter core as claimed in claim 1, wherein the tube has an external screw thread; an internal screw thread is formed on an inner wall of the outlet of the main body; the tube is engaged with the main body by screwing the external screw thread and the internal screw thread.

4. The oil filter with replaceable filter core as claimed in claim 1, wherein the tube and the main body are integrally formed as a monolithic unit.

5. The oil filter with replaceable filter core as claimed in claim 1, wherein the filter core comprises a filter element and a tube, the filter element is configured to filter the machine oil and fits around an outer portion of the tube; the tube is in a hollow structure with two openings formed on two ends of the tube; a wall of the tube has a plurality of holes; one of the two ends of the tube is connected to the outlet of the main body; the machine oil flows into the main body through the inlet and passes through the filter element, and flows into the tube through the plurality of holes and flows out through the outlet.

6. The oil filter with replaceable filter core as claimed in claim 5, wherein the filter core comprises a first unidirectional valve and a second unidirectional valve which are respectively disposed on the two ends of the tube; the machine oil flows into the tube through the plurality of holes and passes through the first unidirectional valve and flows out through the outlet;

the first unidirectional valve is adapted to prevent the machine oil from flowing back into the tube;

the machine oil flowing between the main body and the tube passes through the second unidirectional valve and enters the tube; the second unidirectional valve is adapted to prevent the machine oil from flowing back into a space between the main body and the tube.

7. The oil filter with replaceable filter core as claimed in claim 1, wherein the seal cap has an external screw thread; an internal screw thread is formed on an inner wall of the opening of the main body; the seal cap is engaged with the main body by screwing the external screw thread and the internal screw thread, so as to seal the opening of the main body.

8. The oil filter with replaceable filter core as claimed in claim 1, wherein the main body is made of aluminum.

* * * * *